United States Patent
Therrien et al.

(10) Patent No.: US 11,223,688 B2
(45) Date of Patent: Jan. 11, 2022

(54) SIP MICROSERVICES ARCHITECTURE FOR CONTAINER ORCHESTRATED ENVIRONMENTS

(71) Applicant: MOTOROLA SOLUTIONS, INC., Chicago, IL (US)

(72) Inventors: Nicolas Therrien, Gatineau (CA); Dave Piche, Gatineau (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/730,091

(22) Filed: Dec. 30, 2019

(65) Prior Publication Data

US 2021/0203729 A1    Jul. 1, 2021

(51) Int. Cl.
*H04L 29/08*    (2006.01)
*H04L 12/939*    (2013.01)
*H04L 29/06*    (2006.01)

(52) U.S. Cl.
CPC .......... *H04L 67/142* (2013.01); *H04L 49/552* (2013.01); *H04L 65/1006* (2013.01); *H04L 67/1002* (2013.01); *H04L 69/28* (2013.01); *H04L 67/1095* (2013.01)

(58) Field of Classification Search
CPC ............. H04L 65/1006; H04L 65/1013; H04L 65/102; H04L 65/1033; H04L 65/1046; H04L 65/105; H04L 65/1066; H04L 67/10; H04L 67/1002; H04L 67/1095;

(Continued)

(56) References Cited

U.S. PATENT DOCUMENTS 8,140,895 B2 *   3/2012   Lu ...................... H04L 65/1006
                                                                                                     714/15
8,301,782 B2   10/2012   Kota et al.
9,137,368 B2   9/2015   Jasper et al.
(Continued)

FOREIGN PATENT DOCUMENTS

CN          102158612 A      8/2011
KR       20080037448 A      4/2008

OTHER PUBLICATIONS

SIP, IETF RFC3261. "Session Initiation Protocol." RFC3261 20 (2002). (Year: 2002).*

(Continued)

*Primary Examiner* — Vivek Srivastava
*Assistant Examiner* — William C McBeth
(74) *Attorney, Agent, or Firm* — Michael Best & Friedrich LLP

(57) ABSTRACT

Systems and methods for message processing. In one example, a system includes a state cluster network, a synchronization cluster network, and an engine cluster network. The engine cluster network includes an electronic processor configured to receive a first message corresponding to either a session initiation protocol message or a timeout message, retrieve, from the state cluster network, a session initiation protocol data object, initialize a state machine using the session initiation protocol data object and process the first message, transmit a timer request to the synchronization cluster network for managing a timer, transmit a second session initiation protocol message to a target entity based on the received first message, and transmit a second session initiation protocol message to the state cluster network.

8 Claims, 3 Drawing Sheets

(58) Field of Classification Search
CPC ....... H04L 67/14; H04L 67/142; H04L 69/28; H04L 69/40; H04L 65/1069; H04L 65/1083
See application file for complete search history.

(56) References Cited

U.S. PATENT DOCUMENTS

| | | | |
|---|---|---|---|
| 2006/0153064 A1* | 7/2006 | Caballero-McCann | H04L 67/14 370/216 |
| 2007/0288481 A1* | 12/2007 | Shinn | G06F 11/203 |
| 2008/0086567 A1 | 4/2008 | Langen et al. | |
| 2008/0155310 A1* | 6/2008 | Langen | H04L 65/1006 714/6.12 |
| 2008/0212766 A1* | 9/2008 | Kota | H04L 65/1006 379/221.08 |
| 2009/0006598 A1* | 1/2009 | Cosmadopoulos | H04L 67/14 709/223 |
| 2009/0271798 A1* | 10/2009 | Iyengar | H04L 67/1002 718/105 |
| 2010/0106842 A1* | 4/2010 | Cosmadopoulos | H04L 69/28 709/228 |
| 2012/0096179 A1* | 4/2012 | Tombroff | H04L 65/1006 709/230 |
| 2013/0054806 A1* | 2/2013 | Francis | H04L 67/1002 709/226 |
| 2014/0115176 A1* | 4/2014 | Kamboh | H04L 67/142 709/228 |
| 2018/0004582 A1* | 1/2018 | Hallenstal | H04L 67/10 |
| 2021/0200609 A1* | 7/2021 | Petersen | G06F 9/546 |

OTHER PUBLICATIONS

Evosip (https://evosip.cloud/—https://www.youtube.com/watch?v=QOB998rAyUM) May 16, 2018.

* cited by examiner

SIP MICROSERVICES ARCHITECTURE FOR CONTAINER ORCHESTRATED ENVIRONMENTS

BACKGROUND OF THE INVENTION

Microservices are provided in a computing architecture, in which each application is decomposed into a plurality of different, smaller services (microservices). Each of these microservices runs its own application processes and communicates with light-weight mechanisms (for example, application program interfaces (APIs)). Because microservices are implemented and deployed independently of each other (independent processes), they may be monitored and scaled independently while facilitating continuous delivery and deployment. Existing monolithic software applications, for example, emergency call/message handling applications, have been modified to be implemented as microservices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
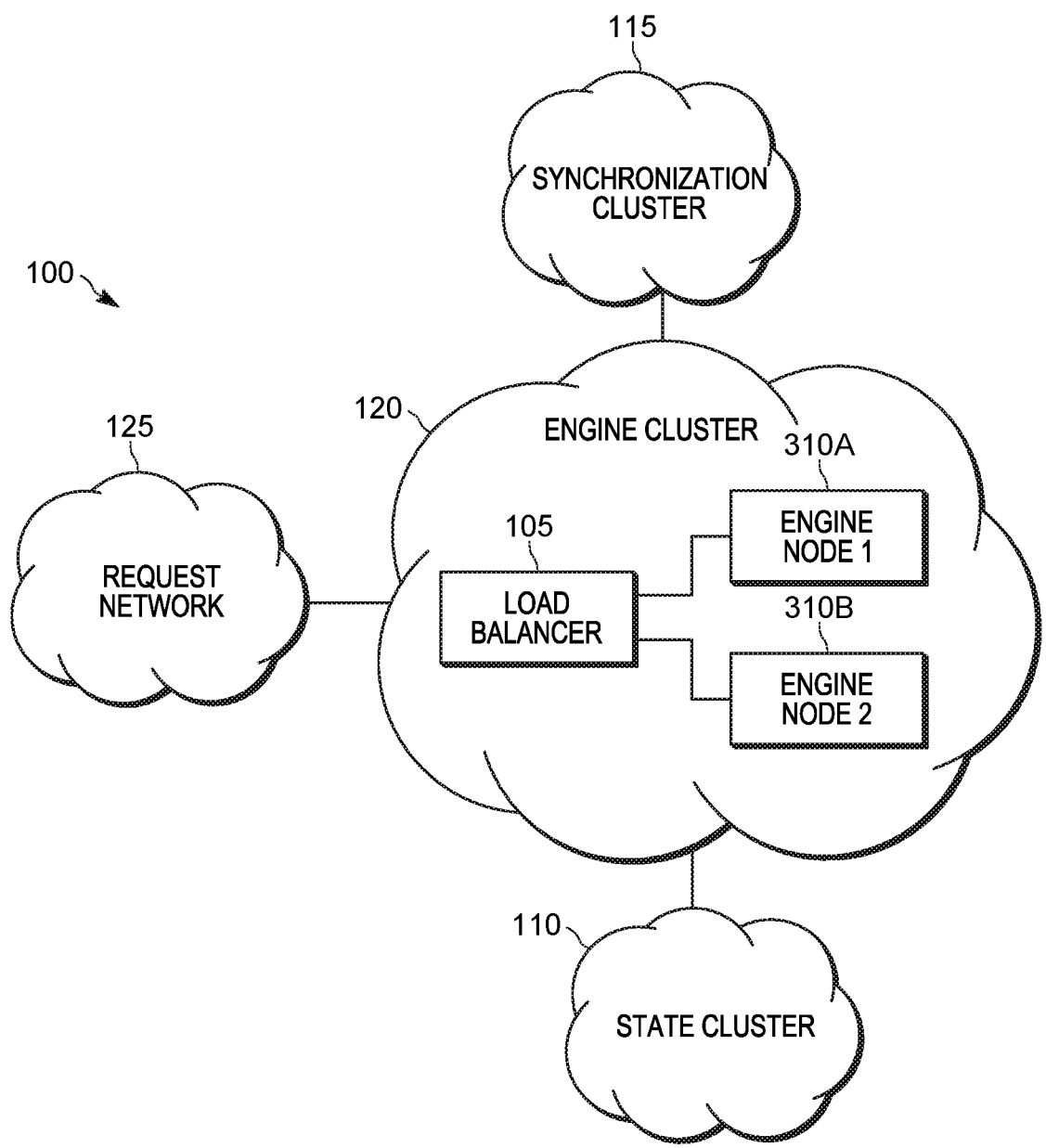
FIG. 1 is a diagram of a microservice system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Emergency call handling services require at least one server to process calls and connect them to a dispatcher. To ensure network availability in case of a server failure, multiple servers are utilized in the network. However, in case of a server failure, information regarding the calls being handled by the failed server may be lost. To prevent information loss in such instances, a monitoring processor may be used to provide the same call information to multiple servers so that if one server fails, a second server may recover the call information.

While such a server architecture enables information recovery, there is minimal load distribution and limited capacity. To scale the size of the network to handle more calls, a "load balancing" cluster network may be utilized. However, in such systems, timer data associated with a call is local to the particular node handling the call. Thus, the load balancer should maintain affinity information in order to be able to route messages to the appropriate node. Also, if a node fails during a transaction, it is not possible for another node to recover the timer information of the particular call. Failure detection and call recovery mechanisms may be implemented to resume the call and reset the necessary timers. This affinity problem, however, adds complexity to the design and may not be implemented well in container orchestrated environments. State information is also local to each particular node. While this state information may be replicated across nodes, as the number of nodes increases, the number of necessary replications increases, hindering the degree in which the network may be scaled practically.

Accordingly, systems and methods described herein are directed to, among other things, reducing the affinity and scaling problems discussed above.

One embodiment provides a microservice system for message processing. The system includes a state cluster network, a synchronization cluster network, and an engine cluster network. The engine cluster network includes an electronic processor configured to receive a first message corresponding to either a session initiation protocol message or a timeout message, retrieve, from the state cluster network, a session initiation protocol data object, initialize a state machine using the session initiation protocol data object, and process the first message. The processor is further configured to transmit a timer request to the synchronization cluster network for managing a timer, transmit a second session initiation protocol message to a target entity based on the received first message, and transmit a second session initiation protocol object to the state cluster network.

Another embodiment provides a method for processing messages on a microservice system including a state cluster network, a synchronization cluster network, and an engine cluster network. The method includes receiving, at the state cluster network, a first message corresponding to either a session initiation protocol message or a timeout message, retrieving, from the state cluster network, a session initiation protocol data object, initializing a state machine using the session initiation protocol data object and process the first message. The method also includes transmitting a timer request to the synchronization cluster network for managing a timer, transmitting a second session initiation protocol message to a target entity based on the received first message, and transmitting a second session initiation protocol object to the state cluster network.

Before embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. For example, although the examples described herein are in terms of emergency call handling systems, in other embodiments, the methods described herein may be applied to different applications (for example, customer service request handling).

For ease of description, some of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should be understood that although the system depicts components as logically separate, such depiction is merely for illustrative purposes. In some embodiments, the illustrated components may be combined or divided into separate software, firmware and/or hardware. Regardless of how they are combined or divided, these components may be executed on the same computing device or may be distributed among different computing devices connected by one or more networks or other suitable communication means.

FIG. 1 is a diagram of one embodiment of a microservice system 100. In the example shown, the microservice system 100 includes a state cluster network 110, a synchronization cluster network 115, and an engine cluster network 120. The microservice system 100 may be a wired network, a wireless network, or both. All or parts of the microservice system 100 may be implemented using various communication networks, for example, a cellular network, computer networks (for example, the Internet), a Bluetooth™ network, a wireless local area network (for example, Wi-Fi), a wireless accessory Personal Area Networks (PAN), a machine-to-machine (M2M) autonomous network, a public switched telephone network, and the like. The state cluster network 110 and the plurality of other components of the microservice system 100 communicate with each other using suitable wireless or wired communication protocols. In some embodiments, the microservice system 100 is a server and the networks 110, 115, and 120 may be part of an SIP architecture of the system 100.

The microservice system 100 is configured to receive messages from and transmit messages to one or more devices via a request network 125. In particular, the microservice system 100 is configured to provide one or more services to a target entity (for example, a session initiation protocol (SIP) peer or an application utilizing the microservices system 100). For example, in the illustrated embodiment, the microservice system 100 is configured to provide an emergency telephone call handing service. In should be understood that, in some embodiments, the microservice system 100 is configured to provide a different and/or additional services (for example, text message handling, service request handling, and the like). The request network 125 may be implemented using various communication networks (for example, those described above), wired connections, and/or some combination thereof.

The engine cluster network 120 includes a load balancer 105. The load balancer 105 is configured to receive incoming message traffic from the request network 125 and distribute it to a particular node (for example, nodes 310A and 310B, described in more detail below) of the engine cluster network 120 for processing. Although the engine cluster network 120 illustrated in FIGS. 1 and 3 includes two nodes 310A and 310B, it should be understood that the engine cluster network 120 may have any number of nodes. The state cluster network 110, synchronization cluster network 115, and engine cluster network 120 are each an independent cluster network including one or more servers/computers including one or more processors configured to perform particular functions of the microservice system 100.

The engine cluster network 120 is configured to process and fulfill each service request (each of which the handling of is referred to herein as a service session) via nodes 310A-310B. The synchronization cluster network 115 is configured to manage one or more timers that the engine cluster network has registered for a particular service session and notify the engine cluster network 120 in case of a timer expiration. The state cluster network 110 is configured to maintain data associated with various service sessions of the microservice system 100. For example, the state cluster network 110 is configured to store long-lived (stateful) data objects while the engine cluster network 120 may be configured to store short lived (stateless) data objects. The state data may be maintained in partitions storing state replicas. When processing a message, the engine cluster network 120 (via one or more nodes 310A-310B) may pull state data objects from the state cluster network 110, use the objects, and push them back to the state cluster network 110 after processing is complete. When one state replica is unavailable, the engine cluster network 120 may retrieve the objects from another replica in the partition. The engine cluster network 120 may also create new state data objects during a service session and transmit the new state data object to the state cluster network 110 to be maintained accordingly.

For ease of description, the particular functionality of the networks 110, 115, and 120 (and the load balancer 105) are each described in terms of singular components (for example, a single processor). However, it should be understood that such functionality, in some embodiments, may be distributed among a plurality of processors. For example, the functionality performed by the networks 110, 115, and 120 described herein (or a portion thereof) may be distributed among a plurality of processors. In some embodiments, the term "network" is defined as the software and/or hardware included in one or more electrical computing devices that runs application service processes. For example, the engine cluster network 120 can be defined as the combination of software and hardware included in one or more electrical computing devices that runs application processes of a microservice.

Figure 2:
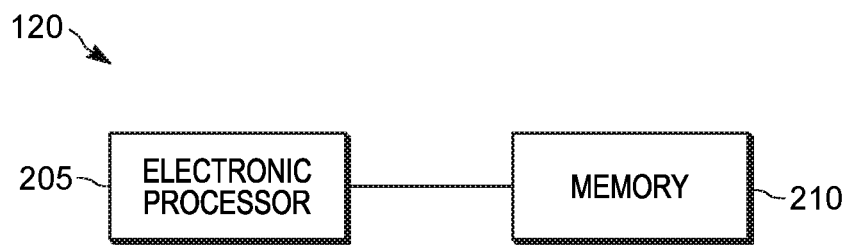
FIG. 2 is a diagram of a node of an engine cluster network of the microservice system of FIG. 1, in accordance with some embodiments.

FIG. 2 is a diagram of node 310A of the engine cluster network 120. For ease of description, the node 310A is described below in terms of singular components. It should be understood that, in some embodiments, the other nodes of the engine cluster network 120 (for example, node 310B) are configured similarly as node 310A. In the embodiment illustrated, the engine cluster network 120 includes an electronic processor 205 (for example, a microprocessor, or other electronic controller) and a memory 210. The electronic processor 205 and the memory 210, as well as other various modules (not shown) are coupled by a bus, or are coupled directly, by one or more additional control or data buses, or a combination thereof. In alternate embodiments, the node 310A may include fewer or additional components in configurations different from that illustrated in FIG. 2. For example, in some embodiments, the node 310A may include a transceiver.

The memory 210 includes read only memory (ROM), random access memory (RAM), other non-transitory computer-readable media, or a combination thereof. The electronic processor 205 is configured to retrieve instructions and data from the memory 210 and execute, among other things, instructions to perform the methods described herein.

In some embodiments, the state cluster network 110, the synchronization cluster network 115, and/or load balancer 105 include components or combinations of different components, including all or some of the various components described above with respect to the engine cluster network 120 (for example, an electronic processor, memory, and, in some embodiments, a transceiver). As a consequence, these components are not described in detail or explicitly illustrated.

Figure 3:
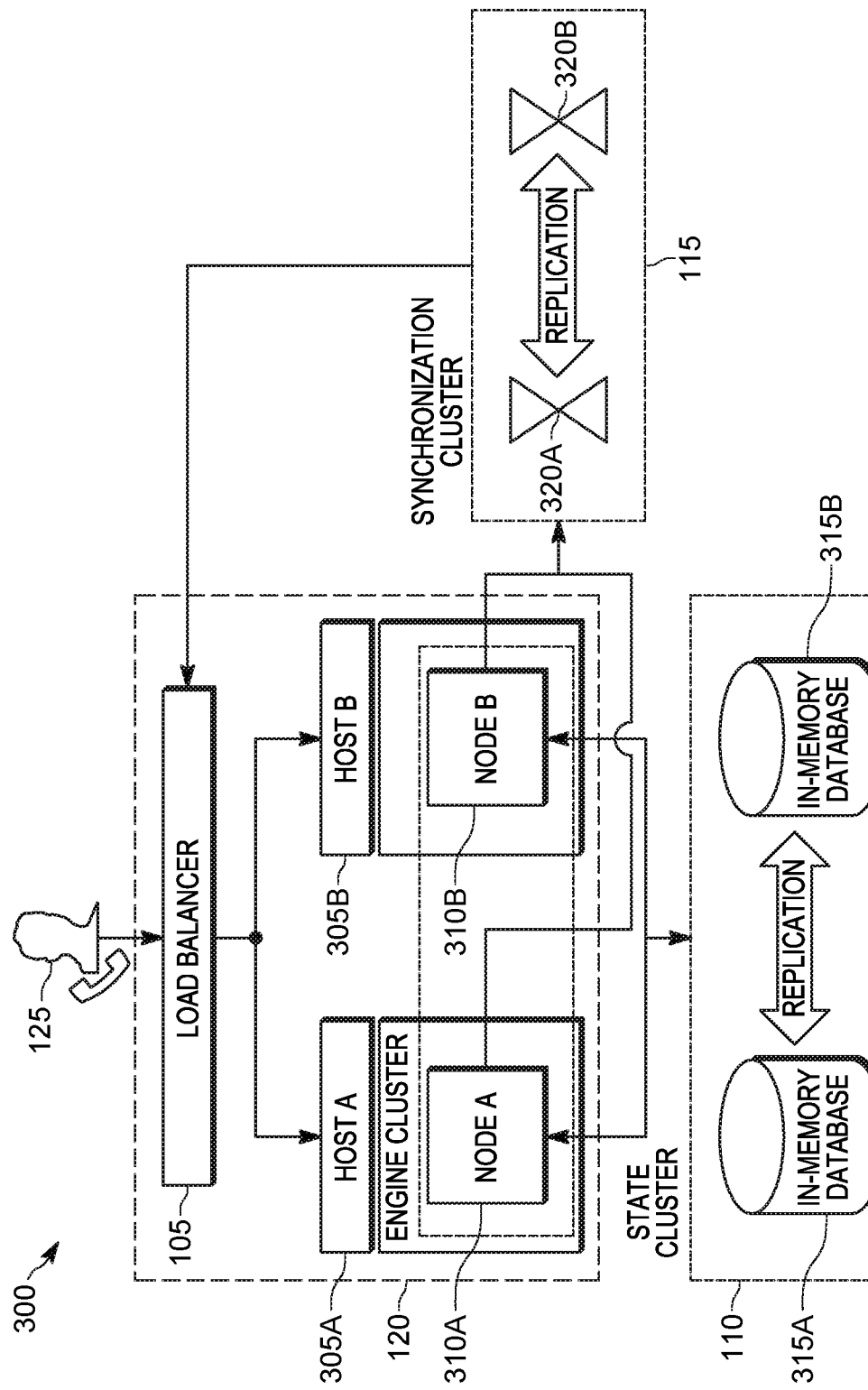
FIG. 3 is a block diagram of the microservice system of FIG. 1, in accordance with some embodiments.

FIG. 3 is a block diagram 300 illustrating the microservice system 100 in accordance with some embodiments. As illustrated in FIG. 3, the load balancer 105 receives one or more service request messages from the request network 125. The load balancer 105 distributes an incoming request to an available host (for example, either host 305A or host 305B) of the engine cluster network 120. Such distribution of requests ensures that the hosts of the engine cluster network 120 are fully utilized. In some embodiments, the load balancer 105 is utilized for performing maintenance activities (for example, upgrading individual servers/applications of the engine cluster network 120).

Each host (host 305A and 305B) of the engine cluster network 120 implements one or more engine nodes/instances (for example, nodes 310A and 310B respectively). Session state data corresponding to a service session being handled by each node 310A, 310B of the engine cluster network 120 is stored in one or more databases (for example, database 315A and 315B respectively) of the state cluster network 110. State data may be replicated between two or more databases 315A, 315B of the state cluster network 110.

To help ensure proper workflow/message handling of the microservice system 100, each node 310A and 310B may initiate/request one or more timers (for example, timers 320A and 320B respectively) to be implemented and maintained at the synchronization cluster network 115. Timer data may be replicated between two or more partitions/databases of the synchronization cluster network 115. The load balancer 105 receives time-out events from the synchronization cluster network 115. The synchronization cluster network 115, by being external and available to any node of the engine cluster network 120, any node may be utilized in timely handling a service request. For example, in case a node handling a message fails during a service session, another available node is able to recover and finish the service session without having the timer reset for the message.

For example, when the engine nodes 310A and 310B are configured to perform call processing services, the load balancer 105 receives one or more calls (for example, a session initiation protocol or SIP message) from the request network 125. Each call received may have a call state associated with it. The call state may contain particular call information (for example, a caller identification, the location of the caller, and the like) and timer objects that may need to be implemented in order to process the call flow. The state for each call is contained in the state cluster network 110 while the engine cluster network 120 stores less information. The engine cluster network 120 requests one or more timers corresponding to each call to be initiated at the synchronization cluster network 115. The synchronization cluster network 115 maintains the one or more timers and notifies the engine cluster network 120, via the load balancer 105, when one or more of the timers expires (referred to herein as a time-out message).

Figure 4:
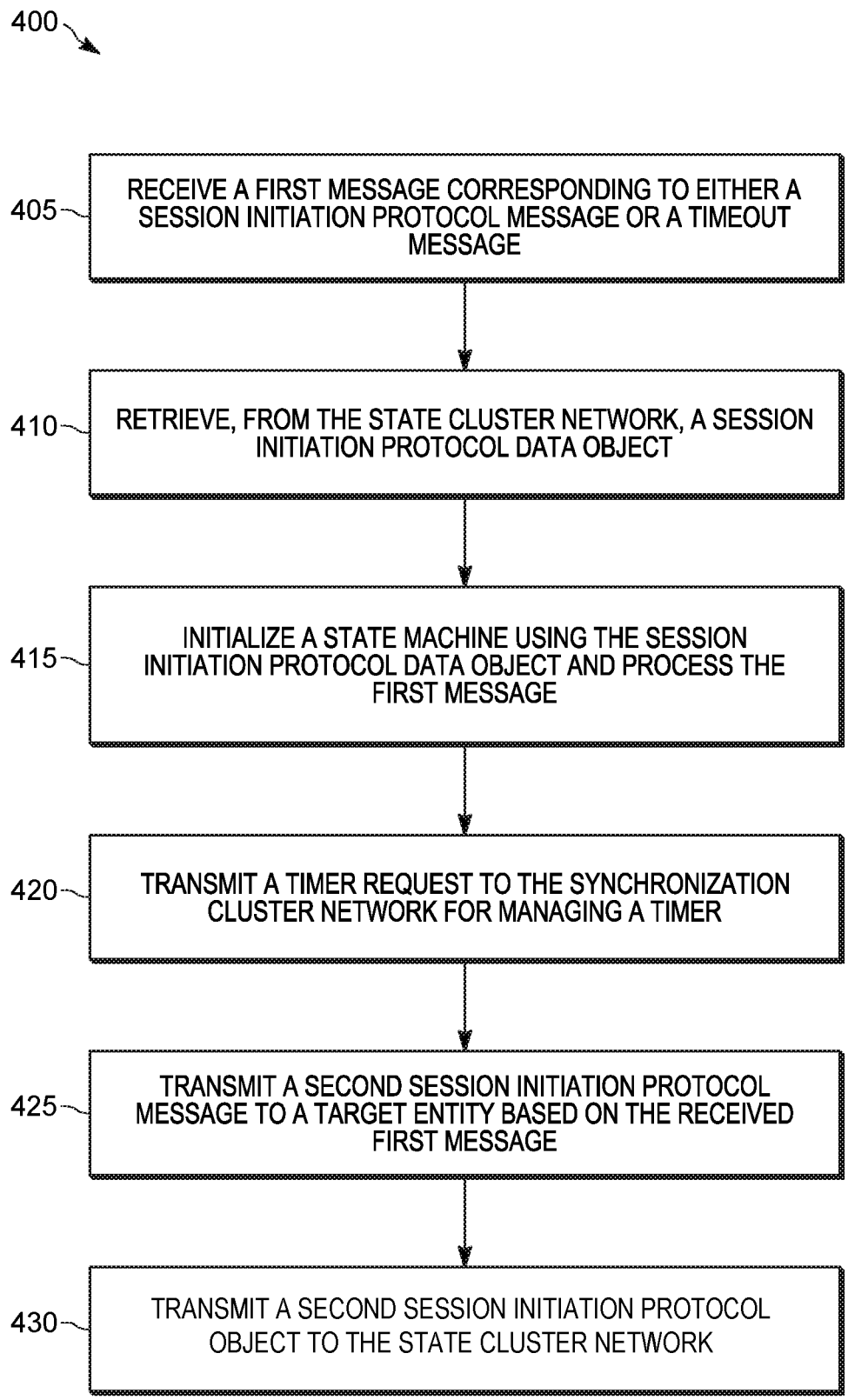
FIG. 4 is a flowchart of a method of managing messages implemented by the communication system of FIG. 1, in accordance with some embodiments.

FIG. 4 illustrates an example method 400 for processing messages on the microservice system 100. As an example, the method 400 is explained in terms of the engine cluster network 120, in particular the electronic processor 205. However, it should be understood that portions of the method 400 may be distributed among multiple devices/components (for example, across multiple processors of the engine cluster network 120).

In the example illustrated, at block 405, to processor 205 receives a first message corresponding either to a SIP message (from the load balancer 105) or a time-out message (from the synchronization cluster network 115). The SIP message is a message requesting a service of the microservice system 100 while the timeout message is a message indicating that a timer associated with a service session has expired.

At block 410, the processor 205 retrieves, from the state cluster network 110, one or more session initiation protocol data objects. The one or more session initiation protocol data objects include state data regarding one or more service sessions being handled by the engine cluster network 120. At block 415, the processor 205 initializes, at the state cluster network 110, a state machine using the session initiation protocol data object and processes the first message. In some embodiments, the processor 205 is configured to, following initializing the state machine, transmit the session initiation protocol data object to the state cluster network 110 and remove the session initiation protocol object from the state cluster network 110. At block 420, the processor 205 transmits, to the synchronization cluster network 115, a timer request for managing a timer. The processor 205 processes/handles the message and, at block 425, transmits a second session initiation protocol message to a target entity based on the received first message. The target entity may be the original requester (for example, a client device or application) that originally provided the message. In some embodiments, the processor 205 is further configured to generate and transmit a second session initiation protocol message to the target entity. At block 430, the processor 205 transmits a second session initiation protocol data object to the state cluster network 110.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A microservice system for message processing, the system comprising:
   a state cluster network;
   a synchronization cluster network; and
   an engine cluster network including a plurality of engine nodes and a load balancer, wherein each engine node of the plurality of engine nodes is configured to:
      receive a first message corresponding to either a session initiation protocol message or a timeout message,
      retrieve, from the state cluster network, a session initiation protocol data object,
      initialize a state machine using the session initiation protocol data object and process the first message,
      transmit a timer request to the synchronization cluster network for managing a timer,
      transmit a second session initiation protocol message to a target entity based on the first message, and
      transmit a second session initiation protocol data object to the state cluster network;
   wherein the synchronization cluster network is configured to:
      maintain one or more timers requested by the engine cluster network, each timer of the one or more timers being accessible to any engine node of the plurality of engine nodes without resetting the timer, and
      send one or more timeout messages to the load balancer;
   wherein the load balancer is configured to receive and distribute the one or more timeout messages and one or more session initiation protocol messages to the plurality of engine nodes such that any engine node may process any timeout message of the one or more timeout messages and any session initiation protocol message of the one or more session initiation protocol messages.

2. The system of claim 1, wherein each engine node of the plurality of engine nodes is configured to register, with the synchronization cluster network, any timer of the one or more timers for a particular session initiation protocol service session being processed by the engine cluster network.

3. The system of claim 1, wherein each engine node of the plurality of engine nodes is further configured to, following initializing the state machine, transmit the session initiation protocol data object to the state cluster network and remove the session initiation protocol data object from the engine cluster network.

4. The system of claim 1, wherein the target entity is a client device or an application.

5. A method for processing messages on a microservice system including a state cluster network, a synchronization cluster network, and an engine cluster network including a plurality of engine nodes and a load balancer, the method comprising:
   receiving, at the engine cluster network, a first message corresponding to either a session initiation protocol message or a timeout message,
   retrieving, from the state cluster network, a session initiation protocol data object,
   initializing a state machine using the session initiation protocol data object and process the first message,
   transmitting a timer request to the synchronization cluster network for managing a timer,
   transmitting a second session initiation protocol message to a target entity based on the received first message,
   transmitting a second session initiation protocol data object to the state cluster network,
   maintaining, with the synchronization cluster network, one or more timers requested by the engine cluster network, each timer of the one or more timers being accessible to any engine node of the plurality of engine nodes without resetting the timer, and
   sending, with the synchronization cluster network, one or more timeout to the load balancer, receiving, with the load balancer, the one or more timeout messages and one or more session initiation protocol messages, and distributing, with the load balancer, the one or more timeout messages and the one or more session initiation protocol messages to the plurality of engine nodes of the engine cluster network, such that any engine node of the plurality of engine nodes may process any timeout message of the one or more timeout messages and any session initiation protocol message of the one or more session initiation protocol messages.

6. The method of claim 5, wherein each engine node of the plurality of engine nodes is configured to register, with the synchronization cluster network, any timer of the one or more timers for a particular session initiation protocol service session being processed by the engine cluster network.

7. The method of claim 5, the method further comprising following initializing the state machine, transmitting the session initiation protocol data object to the state cluster network and removing the session initiation protocol data object from the engine cluster network.

8. The method of claim 5, wherein the target entity is a client device or an application.

* * * * *